No. 795,328. PATENTED JULY 25, 1905.
W. F. AUERBACH.
INDICATOR.
APPLICATION FILED NOV. 22, 1904.
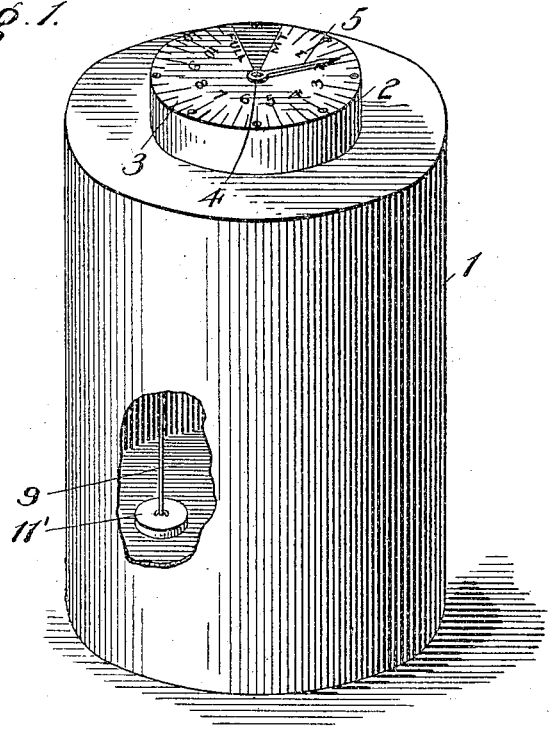
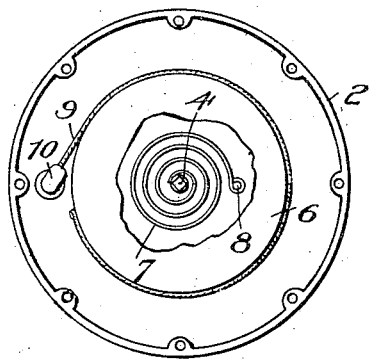
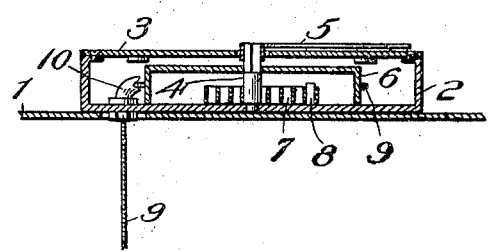
Witnesses
Edwin L. Bradford
Earl S. Prince
Inventor
William F. Auerbach
By Heusey & Gough
Attorneys

UNITED STATES PATENT OFFICE.

WILLIAM F. AUERBACH, OF NEW YORK, N. Y.

INDICATOR.

No. 795,328.　　　　Specification of Letters Patent.　　　Patented July 25, 1905.

Application filed November 22, 1904. Serial No. 233,807.

*To all whom it may concern:*

Be it known that I, WILLIAM F. AUERBACH, a citizen of the United States, residing at New York, in the county of New York and State of New York, have invented new and useful Improvements in Indicators, of which the following is a specification.

This invention has relation to indicators or registers; and it consists in the novel construction and arrangement of its parts, as hereinafter shown and described.

The object of the invention is to provide an indicator or register adapted to be attached to cans or tanks containing oil, gasolene or kerosene, and the like and adapted to show or indicate the level of the liquid contained within the vessel. The indicator consists of a fixed dial-plate having pivoted at its center a hand which is adapted to pass over said dial-plate. A drum is located under said plate and is adapted to rotate with the post supporting said hand. A coil-spring is housed within said drum and is attached at one end to a stationary point and at its other end to said post. A cord passes around said drum and then extends down into the receptacle and is attached at its lower end to a float, which is adapted to rest upon the surface of the liquid located within the receptacle. The tension of the said coil-spring has a tendency to lift the said float; but the said float is of sufficient weight to overcome the tension of said spring and is therefore operated upon by gravity and rests upon the surface of the liquid. As the said surface of the liquid elevates the float is elevated, and through the cord and other attachments the hand above the dial is moved around by the said spring. Thus the level of the liquid within the receptacle is indicated.

The drum above referred to is housed within the casing, which is adapted to rest upon the top of the tank, and the cord which connects the float passes through the oil-inlet opening in the top of the tank. Thus the said casing also serves as a closure for the oil-inlet opening of the tank and may be removed when the tank requires refilling.

In the accompanying drawings, Figure 1 is a perspective view of the tank with parts broken away, showing the indicator attached thereto. Fig. 2 is a top plan view of the indicator with the dial-plate removed, and Fig. 3 is a vertical sectional view of the indicator located on the top of the tank.

The tank 1 is adapted to hold oil, gasolene or kerosene, or any other oil or liquid. The indicator-casing 2 is located on top of said tank, and the dial-plate 3 is located on top of said casing. The post 4 is journaled in the center of said casing 2, and to the upper end of said post is fixed a hand 5, which is adapted to move over said dial-plate 3. The drum 6 is fixed at its center to the said post 4. The coil-spring 7 is fixed at one end to a stationary point 8, located on the bottom of the casing 2, and at its other end to the post 4. The cord 9 is attached at one end to the periphery of the drum 6 and passes around said drum, then down through a sleeve 10 into the tank 1. At the lower end of said cord 9 is attached a float 11', said float resting upon the surface of the liquid contained within said tank. It will thus be seen as the surface of the liquid in the tank 1 descends that the said float 11' falls with the same and the cord 9 pulls the drum 6 around upon its axis against the tension of the coil-spring 7, and thus the hand 5 is caused to rotate over the dial-plate 3, the upper surface of which is provided with suitable marks and characters to indicate the level of the oil. When the tank 1 is filled, the float 11' ascends, and the coil-spring 7 takes up the slack in the cord 9 and causes the drum 6 to rotate in a direction opposite to that above described, and consequently the hand 5 moves over the dial-plate 3 in a direction opposite to that above described, thus indicating the height of the level of the oil.

The tank 1 is provided in its top with the oil-inlet opening 11. The casing 2 rests upon the top of the tank 1, and the lower surface of the said casing serves as a closure for the oil-inlet opening 11 of the tank. The cord 9 enters the tank 1 by passing through the opening 11. When the tank 1 requires refilling, the casing may be lifted off and the filling accomplished through the opening 11, when the said casing 2 may be replaced in position upon the tank and close the said opening.

Having described my invention, what I claim as new, and desire to secure by Letters Patent, is—

In combination with a tank having in its top an oil-inlet opening, a casing adapted to rest upon the top of said tank and close said opening, and having on its top a dial, a rotatable, spring-actuated drum located within said casing, a hand connected with said drum but being located over the dial of the casing, a cord attached at one end to the periphery of said drum and passing around the same, then passing through the bottom of said casing and also passing through the oil-inlet opening of the top of the tank, and a float located within the tank, and being attached to the lower end of said cord.

In testimony whereof I affix my signature in presence of two subscribing witnesses.

WILLIAM F. AUERBACH.

Witnesses:
J. WILLIAM HILL,
G. GLENN WORDEN.